Feb. 23, 1971     M. P. STRIER ET AL     3,565,691
HIGH ENERGY DENSITY SILVER OXIDE-HYDROGEN BATTERY
Filed Nov. 12, 1968
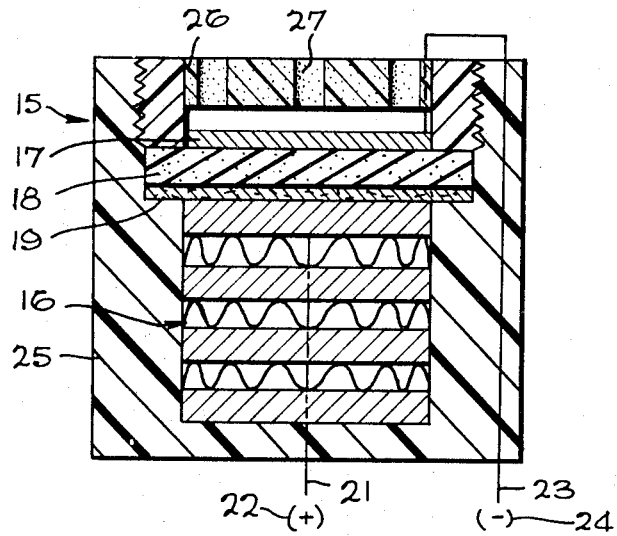
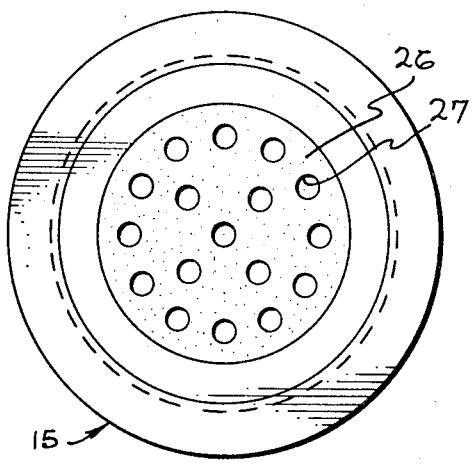
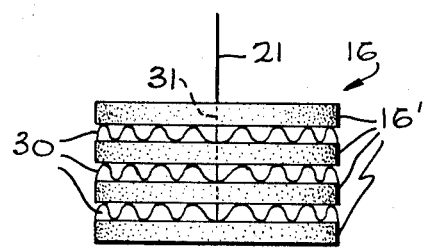
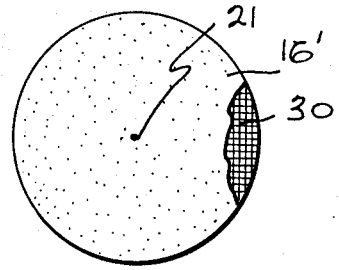
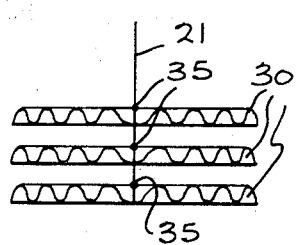
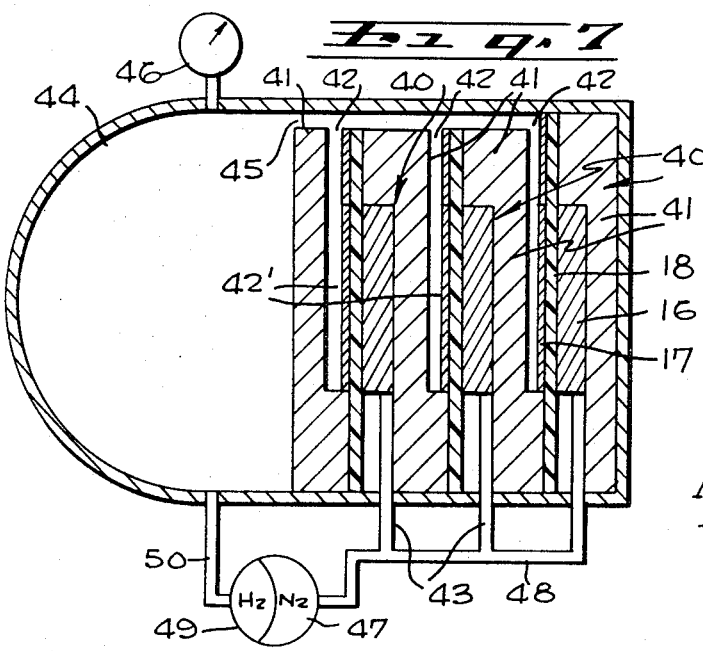
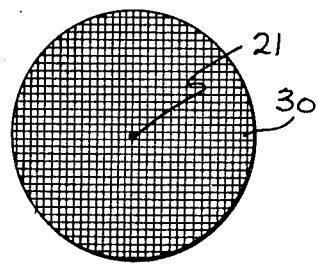
INVENTORS
MURRAY P. STRIER
HARVEY A. FRANK
BY
Max Geldin
ATTORNEY United States Patent Office 3,565,691
Patented Feb. 23, 1971

3,565,691
HIGH ENERGY DENSITY SILVER
OXIDE-HYDROGEN BATTERY
Murray P. Strier, Santa Ana, and Harvey A. Frank, Newport Beach, Calif., assignors to McDonnell Douglas Corporation, Santa Monica, Calif., a corporation of Maryland
Filed Nov. 12, 1968, Ser. No. 774,879
Int. Cl. H01m 35/02
U.S. Cl. 136—20                    13 Claims

ABSTRACT OF THE DISCLOSURE

A solid-fluid cell or battery having a silver oxide cathode, a hydrogen catalyst anode, a separator comprising an inorganic material selected from the group consisting of (a) a solid solution consisting essentially of magnesium silicate and iron silicate, (b) zirconia and (c) alumina, positioned between the electrodes, and electrolyte material, e.g., a 30% aqueous solution of KOH, retained in said separator, to provide an improved high energy density battery of this type.

---

This invention relates to a battery, particularly to an improved high energy density battery having a silver oxide cathode, a hydrogen catalyst anode, and including a porous essentially inorganic separator formed of certain inorganic materials, having good resistance to heat and to alkali, and good porosity characteristics. The battery of the invention incorporating the above components provides, in particular, long operational life and high energy density.

High energy density batteries refer generally to battery systems which have a substantially higher energy per unit weight than conventional batteries, e.g., lead storage batteries.

In recent years there has been considerable interest in the development of new, lightweight, rechargeable batteries primarily for use in cordless appliances and tools, electrically propelled vehicles and the like. The basic economic considerations include very light weight and long operational life. Other important considerations include high energy density, safety and operational length of cycle.

Commercially available high energy density batteries used in the above-noted applications are the high energy density alkaline electrolyte cells using such electrode combinations as silver-zinc, silver-cadmium, and nickel-cadmium. Other high energy density cells presently being developed are the hybrid battery-fuel cells including electrode combinations such as cadmium-oxygen and zinc-oxygen. The hybrid battery-fuel cells operate by bringing as gas such as oxygen or air into contact with the catalyst electrode, e.g., platinum, causing the gas to react with the active battery electrode and generate an electric current.

The hybrid hydrogen-silver oxide battery has only recently been developed. A hydrogen-silver oxide battery employs a gas or hydrogen catalyst anode and a silver cathode. Since both the hydrogen anode and silver cathode of such a battery are quite stable, such a system has the potential advantage of improved life as compared to other high energy density systems. But heretofore, a suitable high performance separator had not been developed for use in hydrogen-silver oxide batteries, such as to fully realize the long life potential of such batteries.

In the high energy density cells, it is conventional to employ a separator or membrane, e.g. in the form of a porous member, between the electrodes for purposes of retaining electrolyte, e.g., a potassium hydroxide solution, separating the electrodes, and preventing migration of electrode ions or growth of dendritic crystals of electrode ions which short circuit the battery.

It has been known to employ organic separators in such batteries but these have several disadvantages. Thus, such organic separators are not chemically stable, especially at temperatures above 50° C., they tend to swell excessively at elevated temperatures, and most organics are not readily wetted by caustic solutions. Further, organics are not inert to silver oxide in caustic solutions, and organic materials are generally soft and pliable and are subject to puncture by dendrite growth.

It has now been found according to the present invention, that incorporation of a separator comprising an inorganic material selected from the group consisting of (a) a solid solution consisting essentially of magnesium silicate and iron silicate, (b) zirconia and (c) alumina, into a battery comprising a silver oxide cathode and a hydrogen catalyst anode, provides a battery system having surprisingly significant and unexpected advantages over the present hybrid battery-fuel cells. For example, the energy density of the silver oxide-hydrogen system of the invention compares quite favorably with that of the widely employed Zn-AgO and Cd-AgO systems. Thus, the $AgO-H_2$ system of the invention employing the above-noted types of inorganic separator provides an energy density ranging from about 75 to about 270 watt-hours/lb.

In addition, employment of the hydrogen "stable" gas anode composed of a noble metal and hydrogen gas rather than a relatively unstable zinc anode makes the silver oxide-hydrogen battery of the invention superior to battery systems employing zinc anodes, which are well known to be subject to slumping, dissolution, and migration of the active material, limiting the operational life of such batteries. The hydrogen gas anode, on the other hand, in a suitably designed system is capable of almost indefinite operation. The use of the essentially inorganic separators of the invention noted above and described in greater detail hereinafter, and particularly a separator comprising the sintered porous solid solution of magnesium silicate and iron silicate, significantly contributes to the long operational life of the battery since such separators are inert to the silver electrode, and prevent migration of silver ions while permitting passage of electrolyte ions through the separator. Such separators also have good porosity, high strength and resistance to the alkali electrolytes employed in the high energy density silver oxide-hydrogen battery of the invention. In addition, such separators have high resistance to damage from impact and vibration. The result is a highly stable cell capable of very long operational life.

While the hydrogen-oxygen fuel cell provides extremely high energy density, and a long operational life, such a system suffers a major disadvantage in that it presents an explosive hazard when in use. This can easily occur by accidental mixing of the two gases and ignition by a spark or catalyst. The hydrogen-silver oxide system of the invention, on the other hand presents little if any safety hazard. Although hydrogen gas is present, there is no oxygen or oxidizable material within the assembly with which the hydrogen can react at an appreciable rate. Even if the hydrogen gas were to come in contact with the silver electrode, the reaction would be quite slow and would not present a hazard. By proper design of the system, the almost complete elimination of any safety hazard is possible by prevention of the formation of explosive mixtures.

Another advantage which the hydrogen-silver oxide system provides (as do the other hybrid battery systems) over the conventional high energy density storage batteries, is that these hybrid battery-fuel cells have a built-in state of charge meter. In these cells, the internal gas pressure varies linearly with the state of charge, with the maximum pressure corresponding to the full state of charge and the lowest pressure corresponding to the completely discharged state. A measure of the internal gas pressure then is a measure of the state of charge. Conventional high energy density storage battery systems have encountered considerable difficulty in measuring the state of charge.

Thus, the hydrogen-silver oxide hybrid battery-fuel cell of the invention employing a separator according to the invention, e.g., in the form of a porous sintered member composed of a solid solution of magnesium silicate and iron silicate, provides one or more advantages of extremely light weight, long operational life, high energy density, high stability and safety over the presently known systems.

In addition to the hydrogen anode, silver oxide cathode, and separator as described above, the invention battery system includes an alkaline electrolyte material, e.g., a 30% to 40% aqueous solution of KOH retained in the separator and in contact with the silver oxide cathode. Preferably, although not necessarily, a layer of porous potassium titanate paper is disposed between the separator and silver oxide cathode in order to minimize contact resistance between the cathode and separator.

The invention will be further described in relation to the accompanying drawing wherein:

FIG. 1 is a schematic representation of the hybrid battery-fuel cell assembly according to the invention;

FIG. 2 shows a schematic representation of the porous cover plate;

FIG. 3 shows in greater detail the assembly of the current collector for the silver oxide electrode of FIG. 1;

FIG. 4 is a plan view of FIG. 3;

FIG. 5 is a detail of FIG. 3;

FIG. 6 is a plan view of FIG. 5; and

FIG. 7 is a schematic representation of a large scale silver oxide-hydrogen battery system according to the invention.

The drawings are exaggerated for purposes of greater clarity.

Referring to FIG. 1 there is shown a schematic diagram of the hydrogen-silver oxide battery according to the invention. The battery shown generally at 15 comprises a silver oxide cathode 16 and a hydrogen catalyst anode 17, e.g., platinum. The two electrodes 16 and 17 are separated by a porous sintered membrane 18 formed of a solid solution consisting essentially of magnesium silicate and iron silicate. A thin layer of potassium titanate pape 19 is disposed between the silver cathode 16 and the separator membrane 18 to minimize contact resistance between the silver cathode 16 and the separator 18. An electrolyte solution, e.g., a 30% aqueous solution of KOH, is impregnated into the porous separator 18. A wire lead 21, e.g., of silver, is disposed in contact with the silver oxide cathode 16 for connection to a positive terminal 22; wire lead 23, e.g., of nickel, is disposed in contact with the catalyst electrode 17 for connection to a negative terminal 24. The battery 15 is enclosed in a case 25, e.g., of Lucite plastic. A porous cover plate 26 permits diffusion of hydrogen gas into contact with the hydrogen catalyst electrode 17. As shown in FIG. 2, the porous cover plate 26 has apertures 27 through which hydrogen gas passes into direct contact with the catalyst electrode 17.

In FIG. 3 which shows the assembly of the silver oxide cathode 16 and current collector for such electrode in detail, grids 30, e.g., of silver, are disposed between porous silver oxide discs 16' each having a central opening or bore 31. The grids 30 are connected by wire lead 21, e.g., of silver, which passes through the bores 31 of the silver oxide discs 16' and extends outwardly from the electrode assembly 16 for external electrical contact. FIG. 4 shows a plan view of the assembly of FIG. 3.

Referring to FIG. 5, there is shown in greater detail the grid current collector of FIG. 3. As shown, the grids or screens 30 are connected to the lead wire 21 by means of spot welds 35. A plan view of the system of FIG. 5 is shown in FIG. 6.

In operation, hydrogen gas is supplied to the catalyst electrode of the cell shown in FIG. 1. The hydrogen gas impinges against the hydrogen catalyst electrode causing oxidation of the hydrogen gas, reduction of the silver oxide cathode to silver, and generation of a current. Following a period of use, after the capacity and the initial discharge voltage at the commencement of an operating cycle have been sufficiently reduced so that the battery no longer operates efficiently, the hybrid battery fuel cell can be recharged by an external power source to oxidize the silver back to silver oxide.

In FIG. 7 there is shown a schematic representation of a large scale silver oxide-hydrogen battery according to the invention. The assembly includes a group of series connected cells 40 each having a silver oxide cathode 16, a hydrogen catalyst anode 17 and a separator 18 disposed between and in contact with the electrodes 16 and 17, with electrolyte, e.g., a 30% aqueous KOH solution, impregnated into the separator. Each of the cells 40 are separated from each other by means of a cell spacer 41. In each cell there is provided an inlet port 42 in communication with a chamber 42' formed between the spacer 41 and the catalyst anode 17, and an inlet 43 in communication with each of the silver oxide cathodes 16. The inlet ports 42 to the hydrogen catalyst electrodes 17 communicate with a hydrogen storage tank 44 by means of a hydrogen manifold 45, for diffusion of hydrogen gas into contact with the hydrogen catalyst electrode 17. A pressure gage 46 attached to the hydrogen storage tank 44 measures the internal gas pressure of the system and provides a means of measuring the state of charge since the internal gas pressure varies linearly with the state of charge, with the maximum pressure corresponding to the full state of charge and the lowest pressure corresponding to the completely discharged state. The inlets 43 to the silver oxide electrodes 16 communicate with a supply of inert gas, e.g., nitrogen, 47 by means of an inert gas manifold 48 as shown. A bellows arrangement 49 is situated in a line 50 between the hydrogen storage reservoir 44 and inert gas manifold 48, for purposes of providing equalization of internal pressure so that there is no differential gas pressure between the hydrogen catalyst electrodes 17 and silver oxide electrodes 16. The bellows operates by displacement on one side by hydrogen and simultaneous compression of the inert gas on the opposite side of the bellows, or vice versa.

The hydrogen catalyst electrode 17 can be composed of any conventional fuel cell type hydrogen catalyst electrode for this purpose. Such catalyst electrode materials can include, for example, platinum, palladium, iridium, nickel boride, tungstic oxides, and the like. Of the above-mentioned materials, platinum black is the most preferred because it exhibits the best response, has the longest life, and is the most reliable. A suitable type, for example, is American Cyanamid Type A.B.–6 or A.B.–40. The latter is composed of a platinum black Teflon mix which has been cured onto a gold plated nickel screen.

Any standard procedure can be employed in making the silver oxide cathode such as for example is described in the literature (See Vindal, G. W., Storage Batteries, John Wiley & Sons, New York, 1955, p. 100). Such electrodes can be prepared, for example, by compressing silver oxide powder, which can also contain some silver powder intermixed with the silver oxide, into the form of discs. A simple and preferred method includes punching out or cutting an electrode of the desired size from the positive silver oxide plates obtained from commercial silver-zinc batteries. As described above and illustrated in FIG. 3, the silver oxide plates are stacked alternately with a grid or screen which serves as a current collector.

The separator employed in the improved hydrogen-silver oxide battery according to the invention preferably is one consisting essentially of a solid solution of magnesium silicate and iron silicate. Such separator can be in the form of a sintered porous member which is preferably comprised of about 10 to about 90 mol percent magnesium silicate, and about 90 to about 10 mol percent iron silicate; most preferably the separator is comprised of from about 40 to about 60 mol percent magnesium silicate and about 60 to about 40 mol percent iron silicate. The silicate can be in the form of ferrous silicate, ferric silicate, or mixtures thereof.

Such separator can be produced from a starting material in the form of a mixture of, for example, suitable proportions of ferrous oxide, magnesium oxide and silicon dioxide. Such starting material or mixture is compacted, e.g., at pressure ranging from about 2,000 to about 10,000 p.s.i., into the form or shape of the separator described, e.g., in the form of disc, and the resulting compacted members are then sintered at a temperature ranging from about 800° C. to about 1,400° C. for a period sufficient to convert the components of the starting mixture into the solid solution of iron silicate and magnesium slicate.

The resulting sintered magnesium silicate-iron silicate solid solution separators formed upon sintering have high strength and good resistance to alkali and controlled porosity. Such separators can have a transverse strength ranging from about 4,000 to about 10,000 p.s.i, and a porosity ranging from about 10% to about 50%. For examjle, the separator can have a thickness of about .030 inch and a porosity of about 15%.

To more readily control shinkage where only a single sintering operation is carried out, the above-noted solid solution of magnesium silicate and iron silicate can be ground and mixed with the unsintered material, and the resulting mixture formed into the desired separator shape, e.g., into the form of discs, by compaction, e.g., at pressures of about 2,000 to about 10,000 p.s.i., and the resulting compacted members or discs are then subjected to further sintering, preferably at temperatures ranging from about 1,000° C., to about 1,500° C.

Alternatively, the preferred magnesium silicate-iron silicate solid solution separator can be produced using as starting material olivine, a naturally occurring mineral which is a magnesium-iron silicate, to form the solid solution of iron silicate-magnesium silicate. The material is compacted and sintered as noted above to form a solid solution as noted above.

The production of such magesium silicate-iron silicate solid solution separators is described in detail in the copending application Ser. No. 539,554, now Pat. No. 3,446,668 of C. Berger et al., filed Apr. 1, 1966, and such disclosure is incorporated herein by reference.

Another form of essentially inorganic separator which can be employed for providing an improved silver-oxide-hydrogen battery according to the invention is a separator consisting essentially of zirconia. An exemplary form of such a separator is one composed of calcia stabilized zirconia, produced by heating a mixture of 96% zirconia ($ZrO_2$), and 4% calcium oxide to temperature of the order of about 3,000° F., to form a solid solution of calcium oxide and zirconium oxide, forming a mixture containing 97% of the resulting calcia stabilized zirconia and 3% bentonite, presintering such material at 1,000 to about 1,200° C., ball milling such sintered material to small particles size, compacting such material into separator membranes at pressures ranging, e.g., from about 2,000 to about 10,000 p.s.i., and sintering again to temperature of about 1,000 to 1,200° C. to produce zirconia separator membranes.

A third form of separator which can be employed in the invention battery is a porous separator consisting essentially of alumina, for example, formed by compacting alumina (aluminum oxides), e.g., at pressures of about 5,000 to 10,000 p.s.i., into membranes, and sintering such membranes at temperatures ranging from about 300° C., to about 1,800° C.

The above-noted inorganic separators are substantially rigid porous membranes having a thickness of about 0.05 to about 0.030 inch and a porosity in the range from about 10% to about 40%.

Also, flexible separators can be employed in the silver-oxide-hydrogen battery of the invention. Such flexible separators consist essentially of a major proportion of the above-noted inorganic separator materials, e.g., a solid solution of magnesium silicate and iron silicate, and a minor proportion of an organic polymeric material, as described in the copending application Ser. No. 676,224, filed Oct. 18, 1967, by C. Berger and F. C. Arrance, or copending application Ser. No. 676,223, filed Oct. 18, 1967, by F. C. Arrance. Such separators can consist, for example, of a major portion, e.g., 80%, of a porous inorganic material which can be, for example, the above-noted magnesium silicate-iron silicate solid solution, and a minor proportion, e.g., 20%, of a water coagulable organic fluorocarbon polymer such as vinylidene fluoride polymer, to bond the particles of the inorganic material, as described in the above application Ser. No. 676,224. Also, flexible separators can be provided consisting for example, of a major portion of the above-noted magnesium silicate-iron silicate solid solution, a minor portion of potassium titanate and a minor portion of a cured organic polymer such as polyphenylene oxide as bonding agent, as described in above application Ser. No. 676,223. The descriptions of such flexible separators and the method of production set forth in above application Ser. Nos. 676,223 and 676,224 are incorporated herein by reference.

The other inorganic separator materials, i.e., zirconio or alumina, can be employed alternatively as the inorganic separator material used in such flexible separators.

Such flexible separators are porous flexible membranes which can have a thickness in the range of about 0.001 to about 0.025 inch, a porosity of about 10% to about 40% and a pore diameter generally ranging from about 1 to about 200 angstrom units, as described in the two above-mentioned 676,223 and 676,224 applications, but can be outside these ranges.

Both the rigid and flexible substantially inorganic separators described above are in the form of porous membranes having porosity characteristics such as to permit passage of electrolyte ions through the interstices of the separator but preventing passage of electrode ions such as the silver ion, and preventing passage of hydrogen gas.

The electrolyte which is impregnated into and retained in the porous separator and thus disposed in contact with the silver oxide cathode can be any alkaline electrolyte such as for example, a 30%–40% aqueous solution of KOH, aqueous solutions of sodium hydroxide, lithium hydroxide, and the like.

The electrolyte can be impregnated into the separator, or into the porous silver oxide cathode, or both, e.g., by soaking these components in the electrolyte. In either case, the electrolyte will migrate into the pores of the separator positioned between the electrodes.

The following are examples of the practice of the invention.

EXAMPLE 1

A battery substantially as described above and illustrated in FIG. 1 is assembled from the following materials:

A porous magnesium silicate-iron silicate solid solution separator is produced employing a mixture of 40% flint (silica), 10% iron oxide calculated as FeO, and 50% magnesium carbonate, calculated as MgO, by weight. A portion of the mixture is first granulated and then sintered by heating the mixture at about 1,260° C., for a period of 2 hours.

The resulting granulated sintered material is then mixed with the initial uncalcined mixture of flint, iron oxide, and magnesium carbonate noted above, in a proportion of 75 parts of the granulated sintered material and 25 parts of the uncalcined mixture. The resulting mixture of sintered material and uncalcined material is then pressed in suitable dies at pressures of about 5,000 p.s.i. The pressed separators are thus formed into discs and such dics are intered by heating at 1,425° C., for two hours. The resulting sintered magnesium silicate-iron silicate separator is in the form of a solid solution of these materials. The separator has a high transverse strength of about 8,000 p.s.i., a porosity of about 15% and a thickness of about 0.30 inch.

The silver oxide cathode is made from the positive plates of commercial silver-zinc batteries by cutting discs from the electrode plates with a punch of the desired size. The discs are stacked alternately with the silver grid and collector wire to form a cathode in the manner described above and illustrated in FIG. 3.

The hydrogen anode is made from commercial fuel cell electrode type A.B.–40 obtained from the American Cyanamid Co. This catalyst electrode is composed of a platinum black Teflon mix which has been cured onto a gold plated nickel screen. A nickel wire is spot welded to the electrode and passed through the cell case for external electrical contact as shown in FIG. 1.

The electrodes and separator are assembled in a hybrid battery substantially as described above and illustrated in FIG. 1, and including a thin layer of potassium titanate paper between the separator and silver oxide cathode, and a 30% aqueous solution of KOH contained in the pores of the separator. The hydrogen catalyst electrode is connected to a source of hydrogen gas. The battery is found to function effectively for long operating times substantially in excess of 1,000 hours.

The characteristics of the battery are given in the following table:

TABLE 1

Theoretical open circuit voltage—1.40 volts
Actual open circuit voltage—1.40 volts
Charge voltage—1.5–1.7 volts
Discharge voltage—1.2–0.9 volts
Capacity—1.15 ah. (ampere hours)
Theoretical capacity—1.25 ah.
Coulombic efficiency—91%
Energy density—75 watt-hours/lb.
Total operating time—3,984 hours
Number of cycles—19

The efficiency of 91% noted above is quite high, considering the fact that the thickness of the silver electrode employed, 0.5 cm., is almost 10 times the thickness of conventional silver electrodes.

The energy density value of 75 watt-hours/lb. takes into account the weight of the complete cell assembly including cell components and case. When all components, including the case and container for hydrogen are optimized for a larger sized cell, e.g., as illustrated in FIG. 7, the energy density will be substantially higher.

EXAMPLE 2

A battery is assembled in a manner substantially as described in Example 1 except that the separator is formed from olivine, a magnesium, iron silicate composed of 41.1% $SiO_2$, 49.3% MgO, and 6% FeO, by weight. The material is compacted at about 5,000 p.s.i., and the compacted separators in the form of discs are sintered by heating at 1,200° C. The resulting sintered separator is in the form of a solid solution of magnesium silicate and iron silicate, containing about 89 mol percent magnesium silicate and about 11 mol percent iron silicate. The separator has a thickness of about 0.030 inch, a transverse strength of about 8,000 p.s.i., and a porosity of about 15%. The battery employing the above separator is found to have properties comparable to that of Example 1.

EXAMPLE 3

A battery substantially as shown in FIG. 7 is assembled using electrode materials produced in the manner described in Example 1.

The battery is found to have the characteristics noted in the following table:

TABLE 2

Number of cells—28
Operating volts—28
Capacity—400 ah.
Total weight—112 lbs.
Total energy—11.2 kwh.
Energy density—100 watt hours/lb.

EXAMPLE 4

The procedure of Example 1 is followed for producing a silver oxide-hydrogen battery as described therein and illustrated in FIG. 1, except employing as the separator a calcia stabilized porous zirconia rigid membrane as separator, produced as described above.

The resulting battery has characteristics similar to those noted in Table 1 of Example 1.

EXAMPLE 5

The procedure of Example 1 is followed for producing a silver oxide-hydrogen battery as described therein and illustrated in FIG. 1, except employing as the separator a porous alumina rigid membrane produced as described above. The resulting battery has characteristics similar to those noted in Table 1 of Example 1.

EXAMPLE 6

The procedure of Example 1 is followed for producing a silver oxide-hydrogen battery as described therein and illustrated in FIG. 1, except employing as the separator a flexible separator as described in Example 4 of above U.S. application Ser. No. 676,224, consisting of 85% by weight of a sintered powdered solid solution of magnesium silicate and iron silicate, prepared as described in Example 7 of above U.S. application Ser. No. 539,554, and about 15% by weight of Kynar (vinylidene fluoride polymer).

The resulting battery has characteristics similar to those noted in Table 1 of Example 1.

It has been found unexpectedly that separators formed essentially of inorganic materials other than those noted above, when employed in a silver oxide-hydrogen battery are substantially inferior to the magnesium silicate-iron silicate, zirconia and alumina separators employed according to the invention. Thus, for example, use of an aluminosilicate separator in such a battery was found to produce a silver oxide-hydrogen battery having a substantially shorter period of operability than when employing the above-noted inorganic materials according to the invention.

From the foregoing, it is seen that the invention provides an improved high energy density silver oxide-hydrogen battery of good electrical efficiency and which has a long period of operability.

Various modifications are contemplated and can be resorted to by those skilled in the art without departing from the spirit and scope of the invention and hence the invention is not to be taken as limited except by the scope of the appended claims.

What is claimed is:

1. A battery comprising a silver oxide cathode, a hydrogen catalyst anode, an aqueous alkaline electrolyte and a separator positioned between said electrodes, said separator comprising an inorganic material selected from the group consisting of (a) a solid solution of magnesium silicate and iron silicate, (b) zirconia and (c) alumina.

2. A battery as defined in claim 1, wherein said separator is in the form of a substantially rigid porous membrane.

3. A battery defined in claim 1, wherein said separator is in the form of a flexible porous membrane consisting essentially of a major proportion of said inorganic material and a minor proportion of an organic polymeric material.

4. A battery as defined in claim 1, wherein said separator comprises a solid solution of magnesium silicate and iron silicate.

5. A battery as defined in claim 4, wherein said solid solution contains about 10 to about 90 mol percent magnesium silicate, and about 90 to about 10 mol percent iron silicate.

6. A battery as defined in claim 1, further including a layer of porous potassium titanate paper disposed between said separator and said silver oxide cathode.

7. A battery comprising a case, and one or more battery cells positioned in said case, said cells each comprising a hydrogen catalyst anode, a silver oxide cathode, an aqueous alkaline electrolyte, a separator positioned between said electrodes for retaining electrolyte, said separator comprising an inorganic material selected from the group consisting of (a) a solid solution of magnesium silicate and iron silicate, (b) zirconia and (c) alumina, a source of hydrogen gas, means permitting diffusion of said hydrogen gas into contact with said hydrogen catalyst anode, first electrical connections to said anode, second electrical connections to said cathode, and terminals for said connections.

8. A battery as defined in claim 7, wherein said separator is in the form of a sintered porous substantially rigid membrane consisting essentially of a solid solution of magnesium silicate and iron silicate, wherein said solid solution contains about 10 to about 90 mol percent magnesium silicate, and about 90 to about 10 mol percent iron silicate.

9. A battery as defined in claim 7, wherein said separator is in the form of a flexible porous membrane consisting essentially of a major proportion of a solid solution of magnesium silicate and iron silicate, wherein said solid solution contains about 10 to about 90 mol percent magnesium silicate, and about 90 to about 10 mol percent iron silicate, and a minor proportion of an organic polymeric material.

10. A battery as defined in claim 7, wherein said hydrogen catalyst cathode is selected from the group consisting of platinum, palladium, iridium, nickel boride and tungstic oxides.

11. A battery as defined in claim 10, wherein said hydrogen catalyst cathode consists of platinum.

12. A battery as defined in claim 7, including an alkaline electrolyte in said separator, said electrolyte being about a 30% to about a 40% aqueous solution of potassium hydroxide.

13. A battery as defined in claim 7, wherein said hydrogen gas source is a hydrogen gas storage reservoir, and including an inert gas reservoir, means for communication of said inert gas reservoir with said silver oxide cathode, a pressure gage communicating with said hydrogen gas storage reservoir for measurement of internal hydrogen pressure, and means for equalization of the internal gas pressure in said battery.

References Cited

UNITED STATES PATENTS

| | | | |
|---|---|---|---|
| 3,021,379 | 2/1962 | Jackel | 136—146 |
| 3,097,975 | 7/1963 | Horn et al. | 136—146 |
| 3,160,527 | 12/1964 | Hess | 136—86 |
| 3,300,344 | 1/1967 | Bray et al. | 136—86D |
| 3,351,491 | 11/1967 | Harris | 136—86 |
| 3,364,077 | 1/1968 | Arrance et al. | 136—146 |
| 3,446,668 | 5/1969 | Arrance et al. | 136—146 |

WINSTON A. DOUGLAS, Primary Examiner

C. F. LE FEVOUR, Assistant Examiner

U.S. Cl. X.R.

136—86, 146